March 30, 1943.　　　A. L. HANNON　　　2,314,937
CONTROL DEVICE FOR OIL COOLERS
Filed Feb. 14, 1942　　　2 Sheets-Sheet 1

Inventor
ANDREW L. HANNON

Patented Mar. 30, 1943

2,314,937

UNITED STATES PATENT OFFICE 2,314,937

CONTROL DEVICE FOR OIL COOLERS

Andrew L. Hannon, Los Angeles, Calif., assignor to The Garrett Corporation, Airesearch Manufacturing Company Division, Inglewood, Calif., a corporation of California Application February 14, 1942, Serial No. 430,949

13 Claims. (Cl. 172—239)

My invention relates in general to a control device wherein a leading member is moved through consecutive positions and a following control part is caused to move through similar positions within a range of movement, and relates in particular to a control for heat exchange devices, such, for example, as an oil cooler for cooling the crankcase oil of internal combustion engines employed in aircraft.

Although the invention has utility in control of various types of devices, as will be hereinafter pointed out, it is believed that this disclosure may be greatly simplified by describing the invention in its present principal use, as a means for controlling the cooling action of an oil cooler or radiator such as employed in conjunction with aircraft engines. With aircraft engines, especially those of large size, the oil cooler employed has passages for utilization of air as a heat absorbing medium, and the cooler is placed in such location that movement of the aircraft relative to the air will cause a flow of air to pass through the cooler. An object of the present invention is to provide an effective means for controlling the flow of heat absorbing medium, such as air, through a heat exchanger of this type, in such manner that the oil or other liquid cooled, will be maintained within a selected range of temperature.

Heat in lubricating oil produces two measurable qualities or changes in state of the oil, namely, a rise in temperature and a change in the viscosity of the oil. The relation of temperature to viscosity is such that reference to either of these values may be used in controlling the flow of air through the heat exchanger or oil cooler. An object of my present invention is to provide a control system having a movable part associated with the heat exchanger and being arranged to move in accordance with either the value of temperature or viscosity of the oil which is passing through a selected part of the cooler, and another part under control of the first mentioned part, arranged to operate a valve element such as shutters or control flap to regulate the flow of air through the cooler.

A special feature of the invention is that the separate parts thereof may be spaced apart or remotely located within the aircraft, under varying conditions, such as dictated by the differences in structure of different types or sizes of aircraft.

An object of the invention is to provide for use with a heat exchanger through which first and second fluids are passed in heat exchanging relation, a first control member which moves in accordance with changes in the state of the first fluid, and a second control member having power means associated therewith, and electrical control means for actuating the power means so as to move the second control member or part in accordance with the movement of the first control member.

It is an object of the invention to provide a control system having a leading part which is movable through a series of positions, and a following part which is automatically moved through different positions in a range of movement in accordance with the movement of the leading part. The leading and following parts may be remotely located. For example, the leading part may consist of a lever movable in the control cabin of an aircraft through consecutive positions indicating positions desired for a remotely located part of the aircraft, such as a flap, and the following part may comprise the flap which is to be moved or a power motivated member connected to the flap so that the flap will have movement corresponding thereto.

A further object of the invention is to provide a control system of the character set forth in the preceding paragraph which is electrically contolled and through use of a small number of interconnecting conductors and relatively simple cooperating switch elements will control the movement of the following part through a relatively large number of consecutive positions within a given range of movement.

A further object is to provide a control system of the general character hereinabove set forth, having in association with the leading and following members a leading switch and a following switch with a small number of switch contacts and a small number of interconnecting conductors, which will control the movement of the following member through a relatively large number of positions in accordance with the movement of the leading member through a similar number of positions.

A further object of the invention is to provide a control system wherein a following part is automatically moved through positions in accordance with the movement of a leading part, and which system also has means whereby the movement of the following part may be controlled from a control station independently of the movement of the leading part.

A further object of the invention is to provide a control system wherein a following part is normally moved automatically through different positions in accordance with the movement of a leading part, with auxiliary or supplementary means for control of the movement of the following part independently of the movement of the previously mentioned leading part. When the invention is applied to a control for an oil cooler, the shutter or flap for control of the air to the cooler is automatically moved in accordance with temperature changes in the oil, but an overriding control may be placed in the control cabin of the aircraft whereby control of the movement of the shutter or flap may be had from this point.

Also, it is an object of this invention to provide an auxiliary control member which is responsive to an increase in pressure differential across the oil cooler and has the function of overriding the first or temperature control means to fully close the shutter or flap when congealing of oil in the cooler has caused a rise in pressure differential across the cooler.

Further objects and advantages of the invention will appear in the following part of the specification which describes a form of the invention adapted to a particular use. Accordingly, some of the details of construction referred to are to be properly regarded as illustrative of the utility of the invention and not limitations upon its general range of application.

Referring to the drawings which are for illustrative purposes only.

Figure 1:
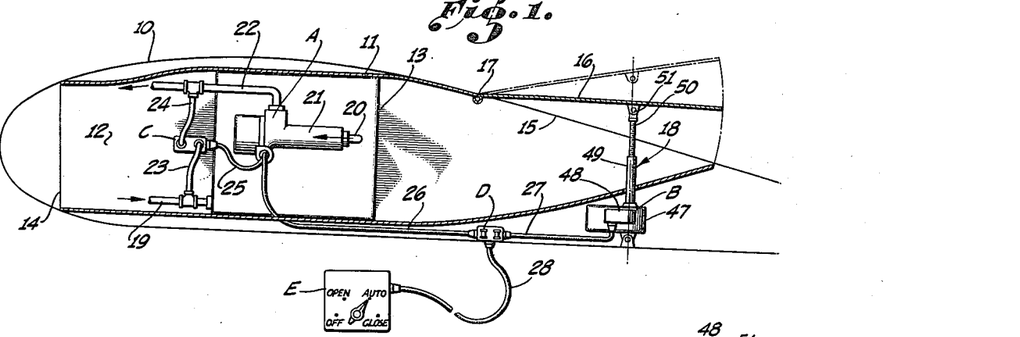
Fig. 1 is a diagrammatic view showing an oil cooler and a preferred embodiment of my invention as used in an air duct of an aircraft.

In Fig. 1 I have by single line indicated the section of a wing 10 of an aircraft. Within this wing a tubular wall 11 forms an air duct 12 in which an oil cooler 13 of radiator type is placed. This oil cooler 13 may be of the well known type having air tubes extending from end to end thereof through which the flow of air which enters the front opening 14 of the duct 12 must pass en route to the rear opening 15 of the duct 12. One of the openings of the duct 12 is provided with an air flow control means whereby the flow of air through the duct 12 and through the cooler 13 may be varied in accordance with the needs of the cooler. This flow control means is preferably placed at the rear opening 15, and is shown as a flap 16 hinged at 17 and having a power device 18 connected thereto so as to move the flap 16 back and forth through a range of positions between open and closed.

The means for controlling the movement of the shutter 16 includes a leading control unit A, a following control unit B associated with the power device, a pressure override control C, a pilot switch unit D, and a manual control unit E. Oil to be cooled flows into the cooler 13 through a pipe 19 and leaves the cooler 13 through an outlet duct 20, which connects with the thermostat chamber or casing 21 of the leading control unit A, and the outlet oil is delivered from the casing 21 to an outlet pipe 22, through which the oil flows preferably to a reservoir or to the engine. The unit C is directly associated with the control unit A and operates in accordance with the pressure differential between the inlet and outlet pressures, or pressure drop across the cooler 13. Accordingly, it is shown connected by means of pipes 23 and 24 with the inlet and outlet pipes 19 and 22 of the cooler 13. An electrical cable 25 is shown connecting the unit C with the leading control unit A. A second cable 26 connects the unit A with the unit D, which is in turn connected through a cable 27 with the following control unit B and through a cable 28 with the manual control unit E.

In the normal operation of the device, the changes in temperature in the oil which passes from the cooler 13 and the duct 20 into the shell 21 of the control unit A determines the operation of the power device 18 so as to open and close the flap 16 in a manner to provide changes in the rate of flow of air through the cooler in accordance with the heat absorbing requirements of the cooler as determined by the changes in temperature of the oil leaving the cooler. Should there be a slight rise in the temperature of the oil leaving the cooler, the flap 16 will be moved a correspondingly small distance toward fully opened position to permit an increase in the rate of flow of air through the cooler, so that an increased amount of heat will be absorbed from the oil passing through the cooler and thereby reduce the temperature of the oil leaving the cooler to a point within or near the selected range of temperature for the oil. Should there be a relatively great change in the temperature of the oil leaving the cooler 13, the movement of the flap 16 will be relatively large. Should there be a rise in the differential pressure between the inlet pipe 19 and the outlet pipe 22, resulting from the congealing of oil within the cooler 13, the unit C will operate to produce a movement of the flap 16 to fully closed position, cutting off the circulation of air through the cooler and causing a temperature rise therein to melt out the congealed layers of oil within the cooler 13 so that the pressure difference between the inlet and outlet of the cooler will be normalized and the leading control unit A may then take over normal control of the shutter 16.

Figures 2, 3:
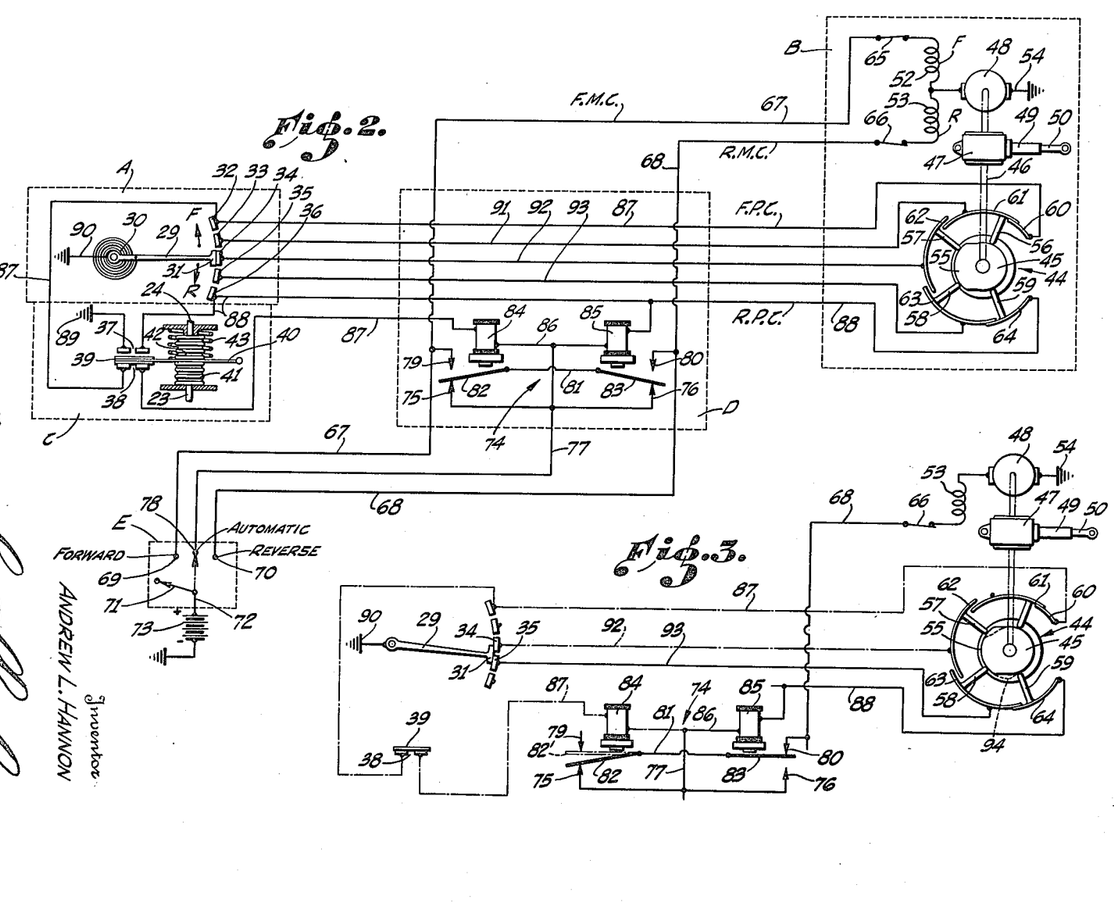
Fig. 2 is an electrical diagram showing also therein schematic representations of mechanical parts.
Fig. 3 is an electrical diagram to show the manner in which the device operates when two of the leading contacts are bridged, this diagram showing those parts of Fig. 2 which are involved in the particular operation described.

In the diagrammatic showing of the control system, Fig. 2, the cooperating parts are shown in a simple manner. The unit A has a moving part 29 which may be referred to as a leading part or leading control member adapted to be moved back and forth through consecutive positions within a range of movement by a bi-metallic thermostat 30, which is disposed within the thermostat casing 21, shown in Fig. 1, and accordingly acts in keeping with the changes in temperature of the cooled oil which passes through the casing 21 to move the member 29 through positions which correspond or indicate the temperature of the oil. The leading control member 29 carries a moving contact 31, preferably moved through an arc so as to engage stationary leading contacts 32, 33, 34, 35, and 36. The moving contact 31 is of such width that it may simultaneously engage two adjacent stationary contacts, as will be later shown. The unit C, which is disposed adjacent the unit A, has therein a pair of contacts 37 and a pair of contacts 38 arranged to be alternately bridged by a moving contact 39, which is shown in Fig. 2 in a position to bridge the contacts 38 and remains in this position during the normal operation of the cooler. When the pressure differential between the inlet and outlet pipes 19 and 22 of Fig. 1 reaches or exceeds a prescribed value, the contact 39 will be moved upward so as to be disengaged from the contacts 38 and so as to engage and bridge or connect the contacts 37. So as to be moved in this manner, the contact 39 is mounted on a lever 40 having expansible members, such as bellows 41 and 42 on opposite sides thereof which are respectively connected through pipes 23 and 24 with the inlet and outlet oil pipes 19 and 22. A coil spring 43 exerts a downward pressure against the lever to determine the pressure differential required to lift the contact 39 from engagement with the contacts 38 into engagement with the contacts 37. Accordingly, when oil congeals within the cooler 13 of Fig. 1, pressure will build up in the inlet pipe 19 and in the bellows 41 and to overcome the action of the spring 43 and produce an upward movement of the contact 39.

The unit B includes a following control switch means 44 having a member 45 which is rotatable within a given range by a connection 46 from the gear box 47 of the power device 18 having therewith a motor 48, which, through the reduction gear system in the gear box 47, rotates an internally threaded sleeve 49 into which a screw 50 is extended, this screw 50 being pivotally attached at 51, Fig. 1, to the flap 16. Rotation of the sleeve 49 in opposite directions will advance and retract the screw 50, and thereby open and close the flap 16. The motor 48 is shown as being of the reversible split field type, having field coils 52 and 53 connected with one brush and with the opposite brush connected to ground, as indicated at 54. The movable member 45 comprises a cam having a lobe 55 arranged to actuate radial push rods 56, 57, 58, and 59, forming operating means which cooperate in connecting and disconnecting series switch members 60, 61, 62, 63 and 64. These switch elements 60 to 64 inclusive are arranged in an arc around the cam 45 and have contact means whereby they may be series connected, the push rods 56 to 59 inclusive actuating such contact means. In the simple arrangement disclosed the contact means comprise the overlapping end portions of the members 60 to 64 inclusive, which are formed from spring metal so that one end of each switch member 61 to 64 inclusive will be urged toward engagement with the adjacent end of another switch member. For example, the rightward end of the switch member 61 overlaps and rests in engagement with the leftward end of the switch member 60, in view of the retracted position of the push rod 56 which is positioned so as to engage the rightward portion of the switch member 61. The push rods 56 and 57, being engaged by the lobe 55 of the cam 45, have raised ends of the switch members 62 and 63 so that the switch member 62 will be disengaged from the switch member 61 and the switch member 63 will be disengaged from the switch member 62. The push rod 59 is shown in retracted position and therefore the swingable end of the switch member 64 rests in engagement with the overlapped end of the switch member 63. As the cam 45 is rotated, the push rods 56—59 will be moved. A small clockwise movement of the cam 45 will move the lobe 55 from under the push rod 58 so that the leftward end of the switch member 63 may be permitted to move into engagement with the lower end of the switch member 62, but the push rod 57 will still hold the switch member 62 disengaged from the switch member 61 and the push rod 57 will not be allowed to retract and thereby permit connection of the switch member 62 with the switch member 61 until the cam lobe 55 has outwardly moved the push rod 56 so as to break the connection between the switch members 61 and 60. In view of the fact that the arc length of the lobe 55 is slightly greater than the arc between the respective push rods, at no time can there be a complete series connection of the switch members 61 to 64 inclusive. Limit switches 65 and 66 connect the field coils 52 and 53 respectively with a forward motor control conductor 67 and a reverse motor control conductor 68, which conductors 67 and 68 extend through the pilot switch unit D and are carried to the manual control unit E where they are respectively connected to contacts 69 and 70 adapted to be engaged by a moving contact 71 which is connected through a conductor 72 with one terminal of a power source, shown as a battery 73. Accordingly manual operation of the control unit E may be had by moving the conductor 71 into engagement with either the conductor 69 or the conductor 70 to accomplish either forward or reverse rotation of the motor 48 which will result in opening or closing movement of the flap 16 within the range defined by the limit switches 65 and 66, which may be placed in cooperative relation to one of the parts moved by the motor 48 so that the limit switch 65 will be opened when the flap 16 reaches fully opened position and so that the limit switch 66 will be opened when the flap reaches fully closed position.

The unit D contains pilot switch means 74 adapted in cooperation with the leading switch means of the unit A and the following switch means of the unit B to energize the circuits 67 and 68 so as to automatically control the opening and closing movement of the flap 16 by the motor 48. The pilot switch 74 has feed switch means shown as contacts 75 and 76 connected to a feed conductor 77 which extends to a contact 78 in the manual control unit E positioned so that it may be engaged by the moving contact 71 and thereby connected to the battery 73. Adjacent the contacts 75 and 76 there are service contacts 79 and 80. Associated with these contacts is switch means 81 including contacts 82 and 83, which switch means is so formed that it may be disengaged from both of the service contacts 79 and 80, as shown in Fig. 2, may be disengaged from both of the contacts 75 and 76, may connect the contacts 75 and 80, or may connect the contacts 79 and 76. Associated with the contact part 82 of the contact means 81, there is an electromagnet 84 which may be energized so as to move the contact 82 into engagement with the service contact 79. If at this time the contact 83 is in engagement with the current supply contact 76, current will flow therefrom through the contact means and the contact 79 to the forward motor control conductor 67, thereby energizing the field 52 of the motor 48 to operate the motor in forward direction. An electromagnet 85 is placed so that when energized it will move the contact 83 from engagement with the contact 76 into engagement with the contact 80, and if at this time the contact 82 is in engagement with the contact 75, current will flow from the contact 75 through the contact means 81, the contact 80 and the reverse motor control conductor 68, thereby energizing the field 53 to operate the motor 48 in reverse direction. Electric current cannot flow from the feed conductor 77 to either of the conductors 67 or 68 when the electromagnets 84 and 85 are both deenergized, nor will current flow to the conductors 67 and 68 when both of the electromagnets 84 and 85 are energized, since at this time the contacts 82 and 83 will be removed from engagement with the contacts 75 and 76.

One side of each electromagnet 84 and 85 is connected to the conductor 77 by connections 86. From the electromagnet 84 there extends the conductor means 87 which includes the contacts 38 of the unit C, is connected to the leading switch contact 32 and extends therefrom to the member 60 of the following switch means 44. For cooperation in forming a circuit therethrough, the electromagnet 85 is connected to conductor means 88 which is connected to the switch member 64 of the following switch means 44, to the leading switch contact 36 and to one of the contacts 37, the other of the contacts 37 being connected to ground at 89. The conductor means 87 cooperate with other conducting means, as shown in Fig. 2, to form a forward pilot circuit, so called for the reason that when it is energized, there will be an energization of the electromagnet 84 and an operation of the pilot switch 74 to produce forward rotation of the motor 48. The conductor means 88 cooperate in forming a reverse pilot circuit, through which a flow of current may be established so as to energize the electromagnet 85 and actuate the pilot switch 74 so that the motor 48 will be operated in reverse direction.

Whenever the conductor means 87 is connected to the negative pole of the battery 73, the forward pilot circuit will be completed and the electromagnet 84 will be energized. For example, the thermostat 30 may move the member 29 so as to bring the moving contact 31 into engagement with the contact 32, thereby connecting the conductor means 87 with the negative pole of the battery 73 through the ground connection indicated at 90 in the unit A and current will flow through the electromagnet 84 provided that the contacts 38 are bridged by the contact 39 and further provided that the contact 71 of the manual switch of unit E is connected to the contact 78. Energization of the electromagnet 84 will raise the switch part 82 into engagement with the contact 79 and current will then flow from feed conductor 77, contact 76, switch part 83, switch part 82, contact 79, conductor 67 and winding 52, thereby operating the motor 48 in forward direction until either the limit switch 65 is opened or the contact 31 is moved out of engagement with the contact 32. Other manners in which the forward pilot circuit may be energized will be described hereinafter.

The reverse pilot circuit, including the conducting means 88 and the magnet switch 85, may be energized as the result of the operation of the pressure override control to carry the movable contact 39 into engagement with the contacts 37, thereby connecting the contact means 88 with ground at 89, or the circuit 88 may be energized by movement of the contact 31 into its lowermost position wherein it will engage only the contact 36. The electromagnet 85 will be then energized and current will flow through the conductor 68 to the motor field winding 53 and reverse rotation of the motor 48 will be continued until either the reverse pilot circuit is broken by movement of the contact 39 out of engagement with the contact 37 or the opening of the limit switch 66. Other manners in which the reverse pilot circuit may be energized will be perceived from the following.

Assuming that the leading control member 29 and the following control member 45 are in the respective positions in which they are shown in Fig. 2, the movement of the member 29 downward into the position in which it is shown in Fig. 3, wherein the moving contact 31 simultaneously engages the contacts 34 and 35, there will be then a current flow from the ground 90 through the contact 35, the interconnecting conductor 93, the connected series switch members 63 and 64, a portion of the conducting means 88, and through the electromagnet 85 to the conductor 77, which is connected to the positive pole of the battery 73. The contact part 83 of the contact means 81 will be lifted into engagement with the contact 80, as shown in full lines in Fig. 3, so that the reverse motor control conductor 68 will be connected through the pilot switch means 81 with the conductor 77. The motor 48, now energized, will be driven in reverse direction and will rotate the cam 45 in anticlockwise direction until the lobe 55 moves to a position such as indicated by dotted line 94, permitting an inward movement of the thrust pin 57 so that the upper end of the series switch member 62 will move into engagement with the series switch member 61, thereby connecting the conducting means 87 with the ground 90 through the switch members 60, 61, and 62, and the contacts 34 and 31, thereby energizing the forward pilot control circuit indicated by broken lines in Fig. 3, provided that the contacts 38 are bridged by the contact 39 to energize the electromagnet 84, which will move the contact part 82 of the switch means 81 from engagement with the contact 75, as indicated by dotted lines 82', and disconnect the conductor 68 from the conductor 77 so as to deenergize the motor 48.

Figure 4:
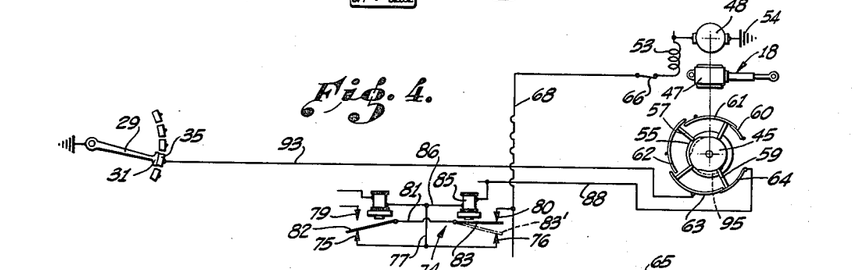
Fig. 4 is an electrical diagram showing electrical connections which are made when the moving contact of the leading switch moves from one stationary contact to the adjacent in a manner to produce a reverse operation of the motor.

As explained in the foregoing, the cooperation of the following switch means of the element B with the leading switch means of the unit A to control the pilot switch means 74 of the unit D will result in a rotation of the motor 48, a movement of the screw 50 and the flap 16 attached thereto, and also a movement of the following switch part represented by the cam 45, proportionate to the movement of the leading control member 29. Should the leading control member 29 be moved downward from the position in which it is shown in Fig. 2 to its position of Fig. 4 so that the contact 31 will engage only the contact 35, a pilot switch control circuit will be established as shown in full lines through the interconnecting conductor 93, the series switch elements 63, and 64, the conducting means 88, the electromagnet 85 and the conductor 77 which is connected to the battery 73, as previously described. The contact means 83 of the switch means 81 will be held in engagement with the contact 80 and the reverse field winding 53 of the motor 48 will be energized through the conductors 77 and 68 until the cam 45 is rotated in anticlockwise direction through an arc of such size that the lobe 55 is brought into the dotted line position 95, to move the thrust pin 59 outward so as to disconnect the series switch member 64 from the series member 63 and thereby break the pilot switch control circuit described as having been formed in part by the conductors 88 and 93, thereby deenergizing the electromagnet 85, whereupon the contact part 83 will drop from engagement with the contact 80, as shown by dotted lines 83', and interrupt the flow of current through the motor 48.

Figure 5:
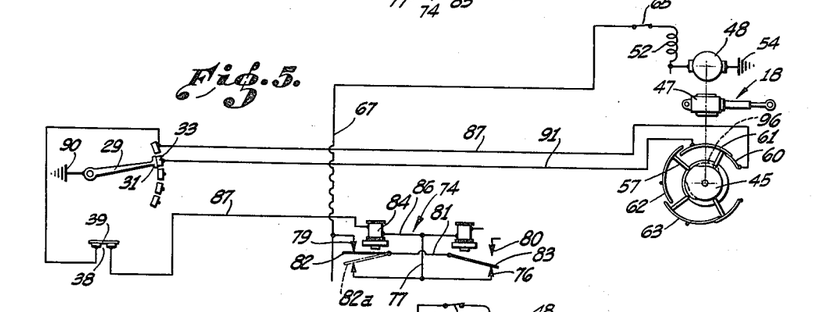
Fig. 5 is an electrical diagram showing leading member of the device moved in forward direction from the position in which it is shown in Fig. 2 to the next adjacent leading contact.

Should heating of the oil passing from the cooler cause the thermostat 30 to move the leading control member 29 upward from its intermediate position shown in Fig. 2, to the position thereof shown in Fig. 5, wherein the contact 31 engages only the contact 33, a pilot switch circuit will be established as shown in full lines, wherein the conductor means 87 is connected with the ground 90 through the contacts 31 and 33, the interconnecting conductor 91 and the series switch members 60 and 61, so that current will then flow through the electromagnet 84 through the circuit formed in part by the conductor 74, raising the contact part 82 of the switch means 81 into engagement with the contact 79 so that the forward motor control conductor 67 will be connected to the conductor 77 through the contact 76 and the switch means 81 which now connects the contacts 76 and 79. The motor 48 will be driven in forward or clockwise direction until the cam 45 moves into a position wherein its lobe, as indicated by dotted lines 96, will force the pin 60 outward so as to disconnect the switch part 61 from the element 60 and thereby interrupt the forward pilot control circuit through which the electromagnet 84 is energized, at a point between the conductor 91 and the conductor means 87. Deenergization of the electromagnet 84 will result in the dropping of the contact member 82 away from the contact 79, as indicated by dotted lines 82a, so as to discontinue flow of current through the motor 48.

Figure 6:
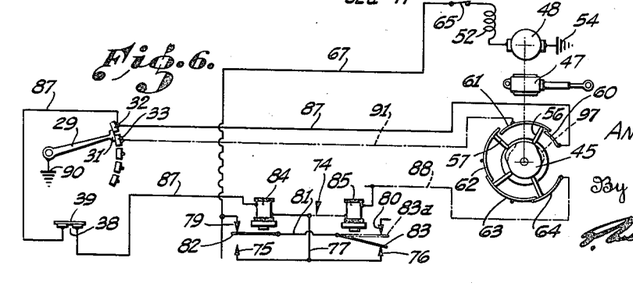
Fig. 6 is an electrical diagram showing the electrical circuit brought into play when the moving contact of the leading switch is brought into a position to energize a pair of leading stationary contacts in the leading switch.

Should the leading control member 29 be then further moved upward from the position shown in Fig. 5, into a position such as shown in Fig. 6 wherein the contact 31 connects the ground 90 with both the contacts 32 and 33, current will then flow through that portion of the conductor means 87 shown in full lines in Fig. 6, energizing the electromagnet 84 so that the switch part 82 will be raised into engagement with the contact 79, closing a circuit through the motor 48, which circuit includes the conductors 77, the contact 78, switch means 81, and the forward motor control conductor 67. The motor 48 will be operated in clockwise direction until the cam 45 has been rotated into a position wherein its lobe, as indicated by dotted lines 97, is removed from engagement with the thrust pin 57 so that the series switch means 62 may move into engagement with the leftward end of the series switch member 61, thereby closing a circuit which includes the conductors indicated by dotted lines in Fig. 6. Current will flow from the ground 90 through the conductor 91, the series switch members 61, 62, 63 and 64, and through the conductor means 88 so as to energize the electromagnet 85, which act will lift the contact part 83 of the switch means 81 from engagement with the contact 76, as shown in dotted lines 83a, thereby disconnecting the conductor 77 from the conductor 67, and stopping the motor, the cam 45 and the flap 16 in a position corresponding to the position of the control member 29 in Fig. 6.

Whether the movement of the contact 31 into engagement with one of the contacts 33—36 of the leading switch means will result in energization of the electromagnet 84 or the electromagnet 85 of the pilot switch 74 depends upon the relative position of the cam 45 at any specified time, for the reason that the position of the lobe 55 of the cam 45 determines whether an interconnecting conductor 91, 92 or 93 is to be connected to either the forward pilot conductor 87 or the reverse pilot conductor 88, or neither of them. The changing series connection of the switch members 60 to 64 inclusive, under control of the cam 45, in cooperation with the remaining parts of the system, enables an automatic operation of the movable part 16 from one end of its range of movement to the other, and vice-versa, under the control of the change of temperature in the oil, as reflected by the movement of the leading control member 29 and by the thermostat 30.

If during the operation of the device there should be a chilling or cooling of the oil in the cooler 13 causing congealing of the oil therein and a severe pressure drop across the cooler, the pressure differential acting in bellows 41 and 42 of unit C will raise the contact 39, Fig. 2, into engagement with the contacts 37, thereby connecting the reverse pilot circuit with ground 89, energizing the electromagnet 85 and lifting the switch part 83 into engagement with contact 80. As previously described herein, this will result in operation of the motor 48 in reverse direction, and this reverse operation of the motor will continue until either the limit switch 66 is opened, or the change in pressure differential in unit C moves the contact 39 from engagement with the contacts 37. After disengagement of the contact 39 from the contacts 37, operation of the system will be automatically controlled as previously explained.

I claim as my invention:

1. In a control device for causing a following member to move in accordance with the movement of a leading member: motor means connected to said following member so as to drive the same; a series switch device having a plurality of switch elements normally connected in series and a switch actuator moving in accordance with the movement of said following member, said switch actuator having means operating to progressively disconnect each of said switch elements from the one adjacent thereto as said actuator is moved from one end of its range of movement to the other; a source of electric current; a leading switch having a plurality of contacts, each separately connected to one of said switch elements, and a movable switch member moving in accordance with the movement of said leading member so as to progressively connect said contacts to one pole of said source of electric current as said leading member moves from one extremity of its range of movement to the other; and means for controlling the operation of said motor means comprising an electro-responsive member connected to one of said switch elements of said series switch device and to the other pole of said source of electric current.

2. In a control device for causing a following member to move in accordance with the movement of a leading member: motor means connected to said following member so as to drive the same; a series switch device having a plurality of switch elements normally connected in series and a switch actuator moving in accordance with the movement of said following member, said switch actuator having means operating to progressively disconnect each of said switch elements from the one adjacent thereto as said actuator is moved from one end of its range of movement to the other; a source of electric current; a leading switch having a plurality of contacts, each separately connected to one of said switch elements, and a movable switch member moving in accordance with the movement of said leading member so as to progressively connect said contacts to one pole of said source of electric current as said leading member moves from one extremity of its range of movement to the other; and a pair of electro-responsive motor control means, each controlling the operation of said motor means in an opposite direction, one of said motor control means being connected to the other pole of said source of electric current and to one of said switch elements at one end of said series switch device, and the other of said motor control means being connected to said other pole of said source of electric current and to the switch element at the opposite end of said series switch device.

3. In a control device for causing a following member to move in accordance with the movement of a leading member: motor means connected to said following member so as to drive the same; a series switch device having a plurality of switch elements normally connected in series and a switch actuator moving in accordance with the movement of said following member, said switch actuator having means operating to progressively disconnect each of said switch elements from the one adjacent thereto as said actuator is moved from one end of its range of movement to the other; a source of electric current; a leading switch having a plurality of contacts, each separately connected to one of said switch elements and a movable switch member moving in accordance with the movement of said leading member so as to progressively connect said contacts to one pole of said source of electric current as said leading member moves from one extremity of its range of movement to the other; means for controlling the operation of said motor means comprising an electro-responsive member connected to one of said switch elements of said series switch device and to the other pole of said source of electric current; and means for controlling the operation of said motor means independently of said previously named means for controlling the operation of said motor means.

4. In a control device for causing a following member to move in accordance with the movement of a leading member: motor means connected to said following member so as to drive the same; a series switch device having a plurality of switch elements normally connected in series and a switch actuator moving in accordance with the movement of said following member, said switch actuator having means operating to progressively disconnect each of said switch elements from the one adjacent thereto as said actuator is moved from one end of its range of movement to the other; a source of electric current; a leading switch having a plurality of contacts, each separately connected to one of said switch elements, and a movable switch member moving in accordance with the movement of said leading member so as to progressively connect said contacts to one pole of said source of electric current as said leading member moves from one extremity of its range of movement to the other; a pair of electro-responsive motor control means, each controlling the operation of said motor means in an opposite direction, one of said motor control means being connected to the other pole of said source of electric current and to one of said switch elements at one end of said series switch device, and the other of said motor control means being connected to said other pole of said source of electric current and to the switch element at the opposite end of said series switch device; and means for controlling the operation of said motor means independently of said pair of motor control means.

5. In a control device for causing a following member to move in accordance with the movement of a leading member; motor means connected to said following member so as to drive the same; a series switch device having two end switch elements and intermediate switch elements arranged between said end switch elements, said switch elements being normally connected in series, and a switch actuator moving in accordance with the movement of said following member from one end of its range of movement to the other, said actuator having means operating as said actuator is moved through its range of movement to progressively disconnect each of said intermediate switch elements first only from the switch element lying to the rear thereof, then from the switch element lying to both the rear and front thereof, and then only from the switch element lying to the front thereof; a source of electric current; a leading switch having a plurality of contacts, each separately connected to one of said switch elements, and a movable switch member moving in accordance with the movement of said leading member so as to progressively connect said contacts to one pole of said source of electric current as said leading member moves from one extremity of its range of movement to the other; and a pair of electro-responsive motor control means, each controlling the operation of said motor means in an opposite direction, one of said motor control means being connected to the other pole of said source of electric current and to one of said switch elements at one end of said series switch device, and the other of said motor control means being connected to said other pole of said source of electric current and to the switch element at the opposite end of said series switch device.

6. In a control device for causing a following member to move in accordance with the movement of a leading member: motor means connected to said following member so as to drive the same; a series switch device having two end switch elements and intermediate switch elements arranged between said end switch elements, said switch elements being normally connected in series, and a switch actuator moving in accordance with the movement of said following member from one end of its range of movement to the other, said actuator having means operating as said actuator is moved through its range of movement to progressively disconnect each of said intermediate switch elements first only from the switch element lying to the rear thereof, then from the switch element lying to both the rear and front thereof, and then only from the switch element lying to the front thereof; a source of electric current; a leading switch having a plurality of contacts, each separately connected to one of said switch elements, and a movable switch member moving in accordance with the movement of said leading member so as to progressively connect said contacts to one pole of said source of electric current as said leading member moves from one extremity of its range of movement to the other; a pair of electroresponsive motor control means, each controlling the operation of said motor means in an opposite direction, one of said motor control means being connected to the other pole of said source of electric current and to one of said switch elements at one end of said series switch device, and the other of said motor control means being connected to said other pole of said source of electric current and to the switch element at the opposite end of said series switch device; and means for controlling the operation of said motor means independently of said pair of motor control means.

7. In a control device for causing a following member to move in accordance with the movement of a leading member: motor means connected to said following member so as to drive the same; a series switch device having two end switch elements and intermediate switch elements arranged between said end switch elements, said switch elements being normally connected in series, and a switch actuator moving in accordance with the movement of said following member from one end of its range of movement to the other, said actuator having means operating as said actuator is moved through its range of movement to progressively disconnect each of said intermediate switch elements first only from the switch element lying to the rear thereof, then from the switch element lying to both the rear and front thereof, and then only from the switch element lying to the front thereof; a source of electric current; a leading switch having a plurality of contacts, each separately connected to one of said switch elements, and a movable switch member moving in accordance with the movement of said leading member so as to progressively connect said contacts to one pole of said source of electric current as said leading member moves from one extremity of its range of movement to the other, said movable switch member being of such size with relation to said contacts that when said switch member is in an intermediate position between two of said contacts, it will engage both of said contacts; and a pair of electro-responsive motor control means, each controlling the operation of said motor means in an opposite direction, one of said motor control means being connected to the other pole of said source of electric current and to one of said switch elements at one end of said series switch device, and the other of said motor control means being connected to said other pole of said source of electric current and to the switch element at the opposite end of said series switch device.

8. In a control device for causing a following member to move in accordance with the movement of a leading member: motor means connected to said following member so as to drive the same; a series switch device having two end switch elements and intermediate switch elements arranged between said end switch elements, said switch elements being normally connected in series, and a switch actuator moving in accordance with the movement of said following member from one end of its range of movement to the other, said actuator having means operating as said actuator is moved through its range of movement to progressively disconnect each of said intermediate switch elements first only from the switch element lying to the rear thereof, then from the switch element lying to both the rear and front thereof, and then only from the switch element lying to the front thereof; a source of electric current; a leading switch having a plurality of contacts, each separately connected to one of said switch elements, and a movable switch member moving in accordance with the movement of said leading member so as to progressively connect said contacts to one pole of said source of electric current as said leading member moves from one extremity of its range of movement to the other, said movable switch member being of such size with relation to said contacts that when said switch member is in an intermediate position between two of said contacts, it will engage both of said two contacts; a pair of electro-responsive motor control means, each controlling the operation of said motor means in an opposite direction, one of said motor control means being connected to the other pole of said source of electric current and to one of said switch elements at one end of said series switch device, and the other of said motor control means being connected to said other pole of said source of electric current and to the switch element at the opposite end of said series switch device; and means for controlling the operation of said motor means independently of said pair of motor control means.

9. In a control device for causing a following member to move in accordance with the movement of a leading member: motor means comprising a reversible motor connected to said following member so as to drive the same; a series switch device having two end switch elements and intermediate switch elements arranged between said end switch elements, said switch elements being normally connected in series, and a switch actuator moving in accordance with the movement of said following member from one end of its range of movement to the other, said actuator having means operating as said actuator is moved through its range of movement to progressively disconnect each of said intermediate switch elements first only from the switch element lying to the rear thereof, then from the switch element lying to both the rear and front thereof, and then only from the switch element lying to the front thereof; a source of electric current; a leading switch having a plurality of contacts, each separately connected to one of said switch elements, and a movable switch member moving in accordance with the movement of said leading member so as to progressively connect said contacts to one pole of said source of electric current as said leading member moves from one extremity of its range of movement to the other; and means for controlling the operation of said motor means in opposite directions, comprising a pair of electro-responsive members, one of which is connected to one pole of said source of electric current and to one of said end series switch elements and the other of which electro-responsive members is connected to said pole of said source of electric current and the other of said end series switch elements, and control switch means operative to energize said motor means so that it will be operated in one direction when one of said electro-responsive members is energized and to energize said motor means so that it will be operated in the opposite direction when the other of said electro-responsive members is energized, and to deenergize said motor means when both of said electro-responsive members are energized and also when both of said electro-responsive members are deenergized.

10. In a control device for causing a following member to move in accordance with the movement of a leading member: motor means connected to said following member so as to drive the same; a series switch device having two end switch elements and intermediate switch elements arranged between said end switch elements, said switch elements being normally connected in series, and a switch actuator moving in accordance with the movement of said following member from one end of its range of movement to the other, said actuator having means operating as said actuator is moved through its range of movement to progressively disconnect each of said intermediate switch elements first only from the switch element lying to the rear thereof, then from the switch element lying to both the rear and front thereof, and then only from the switch element lying to the front thereof; a source of electric current; a leading switch having a plurality of contacts, each separately connected to one of said switch elements, and a movable switch member moving in accordance with the movement of said leading member so as to progressively connect said contacts to one pole of said source of electric current as said leading member moves from one extremity of its range of movement to the other, said movable switch member being of such size with relation to said contacts that when said switch member is in an intermediate position between two of said contacts, it will engage both of said two contacts; and means for controlling the operation of said motor means in opposite directions, comprising a pair of electro-responsive members, one of which is connected to one pole of said source of electric current and to one of said end series switch elements and the other of which electro-responsive members is connected to said pole of said source of electric current and the other of said end series switch elements, and control switch means operative to energize said motor means so that it will be operated in one direction when one of said electro-responsive members is energized and to energize said motor means so that it will be operated in the opposite direction when the other of said electro-responsive members is energized, and to deenergize said motor means when both of said electro-responsive members are energized and also when both of said electro-responsive members are deenergized.

11. In a control device for causing a following member to move in accordance with the movement of a leading member: motor means comprising a reversible motor connected to said following member so as to drive the same; a series switch device having two end switch elements and intermediate switch elements arranged between said end switch elements, said switch elements being normally connected in series, and a switch actuator moving in accordance with the movement of said following member from one end of its range of movement to the other, said actuator having means operating as said actuator is moved through its range of movement to progressively disconnect each of said intermediate switch elements first only from the switch element lying to the rear thereof, then from the switch element lying to both the rear and front thereof, and then only from the switch element lying to the front thereof; a source of electric current; a leading switch having a plurality of contacts, each separately connected to one of said switch elements, and a movable switch member moving in accordance with the movement of said leading member so as to progressively connect said contacts to one pole of said source of electric current as said leading member moves from one extremity of its range of movement to the other; means for controlling the operation of said motor means in opposite direction, comprising a pair of electro-responsive members, one of which is connected to one pole of said source of electric current and to one of said end series switch elements and the other of which electro-responsive members is connected to said pole of said source of electric current and the other of said end series switch elements, and control switch means operative to energize said motor means so that it will be operated in one direction when one of said electro-responsive members is energized and to energize said motor means so that it will be operated in the opposite direction when the other of said electro-responsive members is energized, and to deenergize said motor means when both of said electro-responsive members are energized and also when both of said electro-responsive members are deenergized; and means operated by pressure to energize one of said electro-responsive members.

12. In a means for controlling operation of a motor means in opposite directions, the combination of: a forward control means which when electrically energized causes operation of said motor means in forward direction; a reverse motor control means which when electrically energized causes operation of said motor means in reverse direction; a source of electric current having one pole thereof connected to both of said control means; first and second feed contacts connected to the other pole of said source of electric current; first and second control contacts connected respectively to said forward control means and said reverse control means; a first electromagnet; a second electromagnet; and means operative by said electromagnets to connect said first feed contact with said second control contact as the result of energization of said second electromagnet alone, and to connect said second feed contact to said first control contact as the result of energization of said first electromagnet alone.

13. In a means for controlling operation of a motor means in opposite directions, the combination of: a forward control means which when electrically energized causes operation of said motor means in forward direction; a reverse motor control means which when electrically energized causes operation of said motor means in reverse direction; a source of electric current having one pole thereof connected to both of said control means; first and second feed contacts connected to the other pole of said source of electric current; first and second control contacts connected respectively to said forward control means and said reverse control means; a first electromagnet; a second electromagnet; and a movable switch contact having one portion thereof movable by said first electromagnet from said first feed contact to said first control contact, and having another portion movable by said second electromagnet from said second feed contact to said second control contact.

ANDREW L. HANNON.

CERTIFICATE OF CORRECTION.

Patent No. 2,314,937.                                             March 30, 1943.

ANDREW L. HANNON.

It is hereby certified that error appears in the printed specification of the above numbered patent requiring correction as follows: Page 6, second column, line 17, strike out "ment of a leading member: motor means con-: and that the said Letters Patent should be read with this correction therein that the same may conform to the record of the case in the Patent Office.

Signed and sealed this 25th day of May, A. D. 1943.

(Seal)                                                    Henry Van Arsdale,
                                                       Acting Commissioner of Patents.

CERTIFICATE OF CORRECTION.

Patent No. 2,314,937.  March 30, 1943.

ANDREW L. HANNON.

It is hereby certified that error appears in the printed specification of the above numbered patent requiring correction as follows: Page 6, second column, line 17, strike out "ment of a leading member: motor means con-: and that the said Letters Patent should be read with this correction therein that the same may conform to the record of the case in the Patent Office.

Signed and sealed this 25th day of May, A. D. 1943.

(Seal)
Henry Van Arsdale,
Acting Commissioner of Patents.